United States Patent
Freeman et al.

(10) Patent No.: US 7,731,893 B2
(45) Date of Patent: Jun. 8, 2010

(54) METHOD FOR MAKING ANODES FOR ELECTROLYTIC CAPACITOR WITH HIGH VOLUMETRIC EFFICIENCY

(75) Inventors: Yuri Freeman, Greer, SC (US); Philip Michael Lessner, Newberry, SC (US)

(73) Assignee: Kemet Electronics Corporation, Greenville, SC (US)

( * ) Notice: Subject to any disclaimer, the term of this patent is extended or adjusted under 35 U.S.C. 154(b) by 444 days.

(21) Appl. No.: 11/938,917

(22) Filed: Nov. 13, 2007

(65) Prior Publication Data

US 2008/0145262 A1    Jun. 19, 2008

(51) Int. Cl.
*B22F 3/00*    (2006.01)
(52) U.S. Cl. .............................. 419/31; 419/35; 419/38
(58) Field of Classification Search .................. 419/31, 419/35, 38
See application file for complete search history.

(56) References Cited

U.S. PATENT DOCUMENTS

| | | | |
|---|---|---|---|
| 4,537,641 A | 8/1985 | Albrecht et al. | |
| 5,825,611 A | 10/1998 | Pozdeev | |
| 6,410,083 B1 | 6/2002 | Pozdeev-Freeman | |
| 6,447,570 B1 | 9/2002 | Pozdeev-Freeman | |
| 6,554,884 B1 | 4/2003 | Tripp et al. | |
| 2004/0191108 A1* | 9/2004 | Han et al. | 419/39 |

* cited by examiner

*Primary Examiner*—Roy King
*Assistant Examiner*—Ngoclan T Mai
(74) *Attorney, Agent, or Firm*—John B. Hardaway, III; Nexsen Pruet, LLC

(57) ABSTRACT

A method for manufacturing valve metal anodes of electrolytic capacitors by deoxidizing the anodes using Mg vapor in a deoxidizing furnace, removing the anodes from deoxidizing furnace, placing them in sintering furnace, sintering at temperature lower than the temperature conventionally used for sintering in vacuum, and leaching of Mg oxide off the anode surface. The process limits free oxygen and improves morphology of valve metal anodes, which results in improved performance of electrolytic capacitors with these anodes. The process does not require any special equipment or maintenance operations and, thereby, is highly productive due to performing deoxidizing and sintering separately in traditional deoxidizing and sintering furnaces.

7 Claims, No Drawings

METHOD FOR MAKING ANODES FOR ELECTROLYTIC CAPACITOR WITH HIGH VOLUMETRIC EFFICIENCY

FIELD OF THE INVENTION

This invention relates to methods for formation of refractory valve metal-based anodes with improved volumetric efficiency for application in electrolytic capacitors.

BACKGROUND AND PRIOR ART

High CV powders are desired because of their reduced powder consumption but CV rolling down with increased formation voltage limits the application of high CV powder in high working voltage capacitors. The phenomenon, which is known in both Ta and Nb capacitors, is caused by anodic oxide films growing through the necks between powder particles and clogging pores in sintered anodes. This results in reducing surface area of anodes and, thereby, CV rolling down. Increasing of working voltage with high CV powders is also limited by precipitates of crystalline phase in amorphous matrix of anodic oxide film, which inhibit formation of a thick insulating film on the anode surface and provokes high and unstable D.C. leakage. These precipitates are typically associated with impurities in Ta (Nb) anodes, particularly, with bulk oxygen. The major source of bulk oxygen is natural oxide on Ta (Nb) surface that dissolves in the bulk of Ta (Nb) anodes during their sintering.

U.S. Pat. Nos. 5,825,611 and 6,410,083 and 6,554,884 are representative of attempts to address the crystalline oxide problem by treating the Ta or Nb anodes with nitrogen to purge oxides while limiting nitride precipitates. U.S. Pat. No. 4,537,641 describes reducing of bulk oxygen content in Ta (Nb) anodes (deoxidizing process) by adding reducing agent, e.g. Mg, to anodes and heating the anodes above melting point of the reducing agent and below the temperature conventionally used for sintering of valve-metal anodes. During the heating, vaporized reducing agent deposits on anode surface and reacts with oxygen in Ta (Nb), creating a cover layer of the agent oxide, e.g. MgO layer. After Ta (Nb) anodes are removed from deoxidizing furnace, this cover oxide layer is chemically leached from the anode surface, e.g. MgO is leached in diluted solution of sulfuric acid and hydrogen peroxide.

An alternative process, based on deoxidizing and sintering combination (so called Y-sintering), is disclosed in U.S. Pat. No. 6,447,570. According to the process, the Ta (Nb) powder is pressed into a pellet (a lead wire may be embedded or added later), Mg is added to the pellets, the pellets and Mg are placed in crucibles in a vacuum oven, covered with inert gas, heat treated to generate Mg vapor, deoxidized by Mg, and then sintered in vacuum or inert gas without the anode exposure to air. When oxygen, which is sintering retardant, is removed from Ta (Nb) by deoxidizing, sintering of Ta (Nb) particles requires lower temperatures vs. the temperature conventionally used for sintering of valve-metal anodes. This results in improved morphology of sintered anodes (thicker necks between powder particles and more open pores between the particles). During cooling after the sintering, the pellets are treated with nitrogen to reduce Ta (Nb) affinity for oxygen. After exposure to air, the anodes are leached to remove MgO cover layer. Improved morphology and low oxygen in Ta (Nb) anodes result in improved volumetric efficiency of finished Ta (Nb) electrolytic capacitors. The disadvantage of this prior art is complexity and inefficiency of the equipment needed for its practical realization. During deoxidizing, Mg vapor spreads through the reaction chamber and condenses on all cold parts, including electrical insulation of the heaters. During consequent sintering in vacuum or in inert gas, Mg shunts can cause shortage of the power and control circuits. That's why long and difficult cleaning from residual Mg should be performed after each run of the furnace.

DETAILED DESCRIPTION OF THE INVENTION

The process of this invention provides improved volumetric efficiency to Ta (Nb) anodes using separate deoxidizing and sintering processes while reducing maintenance requirement on equipment.

The pressed Ta (Nb) anodes are deoxidized in a deoxidizing furnace using Mg vapor, preferably in Ar atmosphere. The source of Mg vapor can be Mg powder or chunks placed in the crucibles with the anodes and heated above melting point of Mg (typical temperature range for deoxidizing is 700° C.-1100° C., depending on powder CV). The deposited Mg atoms react with oxygen on Ta (Nb) particle surface, creating a cover layer of MgO and cleaning Ta (Nb) bulk from oxygen. This cover layer prevents formation of a natural oxide on the Ta surface when the anodes are exposed subsequently to air after the deoxidizing.

Immediately or at a later date, the MgO coated anodes are placed in a separate vacuum oven and sintered. Since anodes are practically free of oxygen after the previous step of deoxidizing and new oxygen was not added when anodes were exposed to air, the sintering is performed at lower temperatures vs. the temperature conventionally used for sintering of valve-metal powder, which results in improved morphology and low oxygen in sintered anodes. After cool-down, the MgO cover is removed by leaching in dilute water solution of sulfuric acid and hydrogen peroxide. This process provides improved morphology and low oxygen to Ta (Nb) anodes and, thereby, high volumetric efficiency to finished electrolytic capacitors, while using conventional deoxidizing and sintering furnaces with regular maintenance procedures. The process is used preferably on anodes with pressed-in leads but may be used with welded leads if the pellets are sintered first, welded, then treated with Mg.

EXAMPLE

D-case Ta anodes were pressed with 50 k CV/g Ta powder with embedded Ta wire. Mg chunks were added to the crucibles with Ta anodes, and the crucibles were placed in deoxidizing furnace having an Ar atmosphere. The deoxidizing was performed at approximately 1000° C. for 3 hours. After the cooling, deoxidized anodes were removed from the deoxidizing furnace and placed in a conventional sintering furnace. Sintering was performed in vacuo at 1250° C. for 15 min. After cooling, Ta anodes were removed from sintering furnace, leached in dilute sulfuric acid and hydrogen peroxide, and formed to 60 V in 0.1% water solution of phosphoric acid. Capacitance was tested at 120 Hz in 20% water solution of phosphoric acid. Table 1 shows volumetric efficiency of anodes with conventional sintering in vacuum at 1350° C., with Y-Sintering (deoxidizing and sintering combination), and with the herein described new process (deoxidizing and sintering separately)

TABLE 1

Volumetric efficiency of anodes sintered with different sintering processes.

| Process | Conventional Sintering | Y-Sintering | New Process |
|---|---|---|---|
| CV/cc, uFV/cc | 240,200 | 296,000 | 295,800 |

The new sintering process provides essentially the same increased volumetric efficiency as obtained with Y-sintering; however, it doesn't require any special equipment or maintenance operations and, thereby, is highly productive due to performing deoxidizing and sintering separately in traditional deoxidizing and sintering furnaces. The stability of the deoxidized pellet in air provides production flexibility not possible using the prior art process.

INDUSTRIAL UTILITY

The process of this invention is useful in the capacitor industry to supply components to the electronics industry.

The invention has been described in terms of preferred embodiments. Modifications apparent to those with skill in the art are included within the scope of the invention.

The invention claimed is:

1. A process of manufacturing valve metal anodes for electrolytic capacitors with high volumetric efficiency comprising: pressing of pellets from a valve metal powder, deoxidizing of pressed pellets with reducing agent in a deoxidizing furnace to form an anode; forming a sealing layer on all anode surfaces preventing oxidation; removing said anode from said deoxidizing furnace; placing said anode in a sintering furnace; sintering in a vacuum or under inert gas; and leaching of the sealing layer from the anode surfaces.

2. A process according to claim 1 wherein reducing agent is Mg and deoxidizing temperatures are about the range 700° C.-1100° C.

3. A process according to claim 1 wherein said sealing layer is MgO.

4. A process according to claim 1, wherein the sintering temperature is above deoxidizing temperature and below the temperature conventionally used for sintering in vacuum.

5. A process according to claim 1, wherein leaching of sealing layer is performed in water solution of sulfuric acid and hydrogen peroxide.

6. A process according to claim 1 wherein a lead wire has been pressed with the anode pellets.

7. A process according to claim 1 wherein an anode lead is attached after pressing or sintering.

* * * * *